L. R. EWART.
HEADLIGHT CONTROLLER FOR VEHICLES.
APPLICATION FILED MAR. 7, 1915.
1,198,711.
Patented Sept. 19, 1916.
2 SHEETS—SHEET 1.
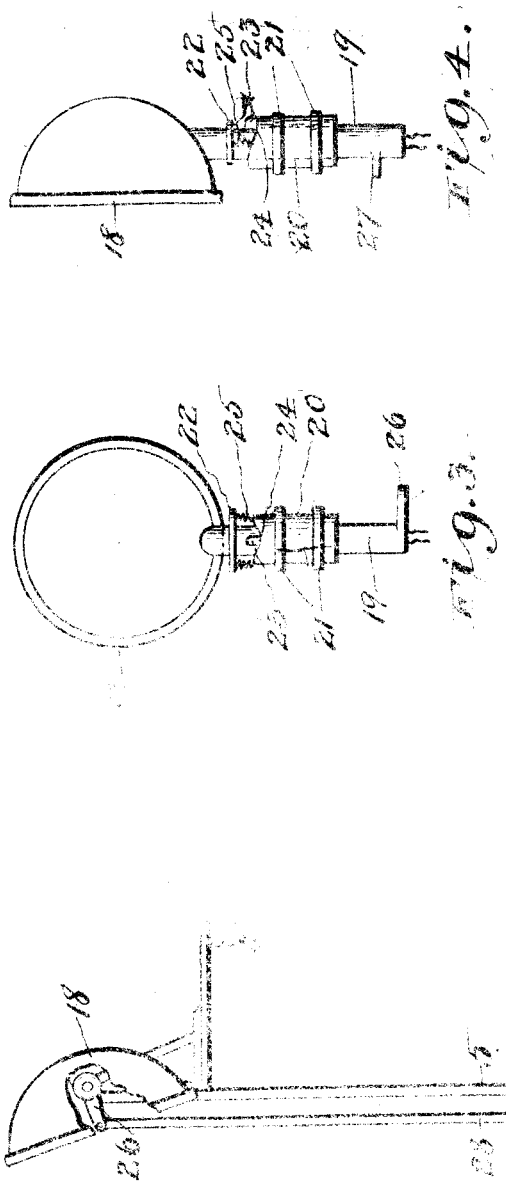
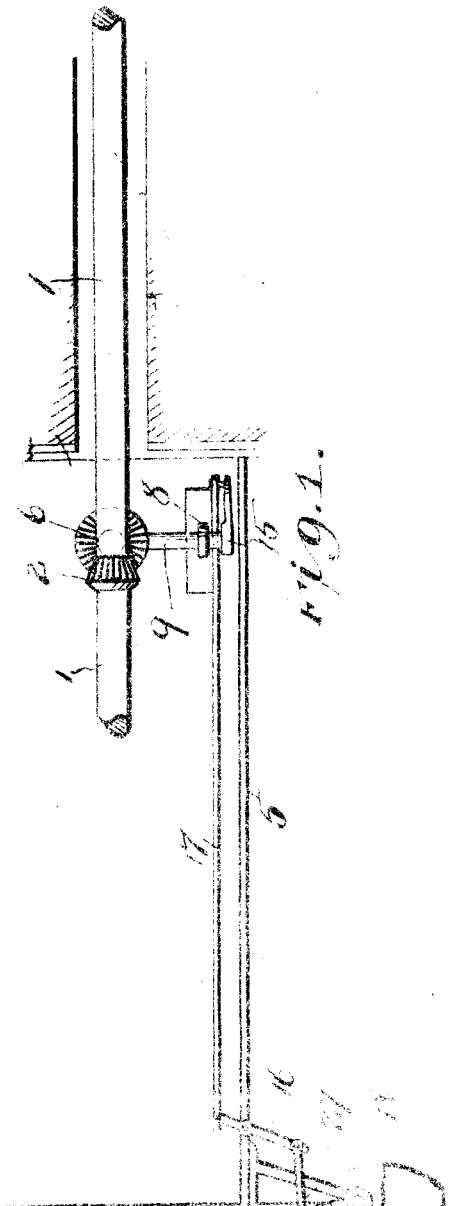

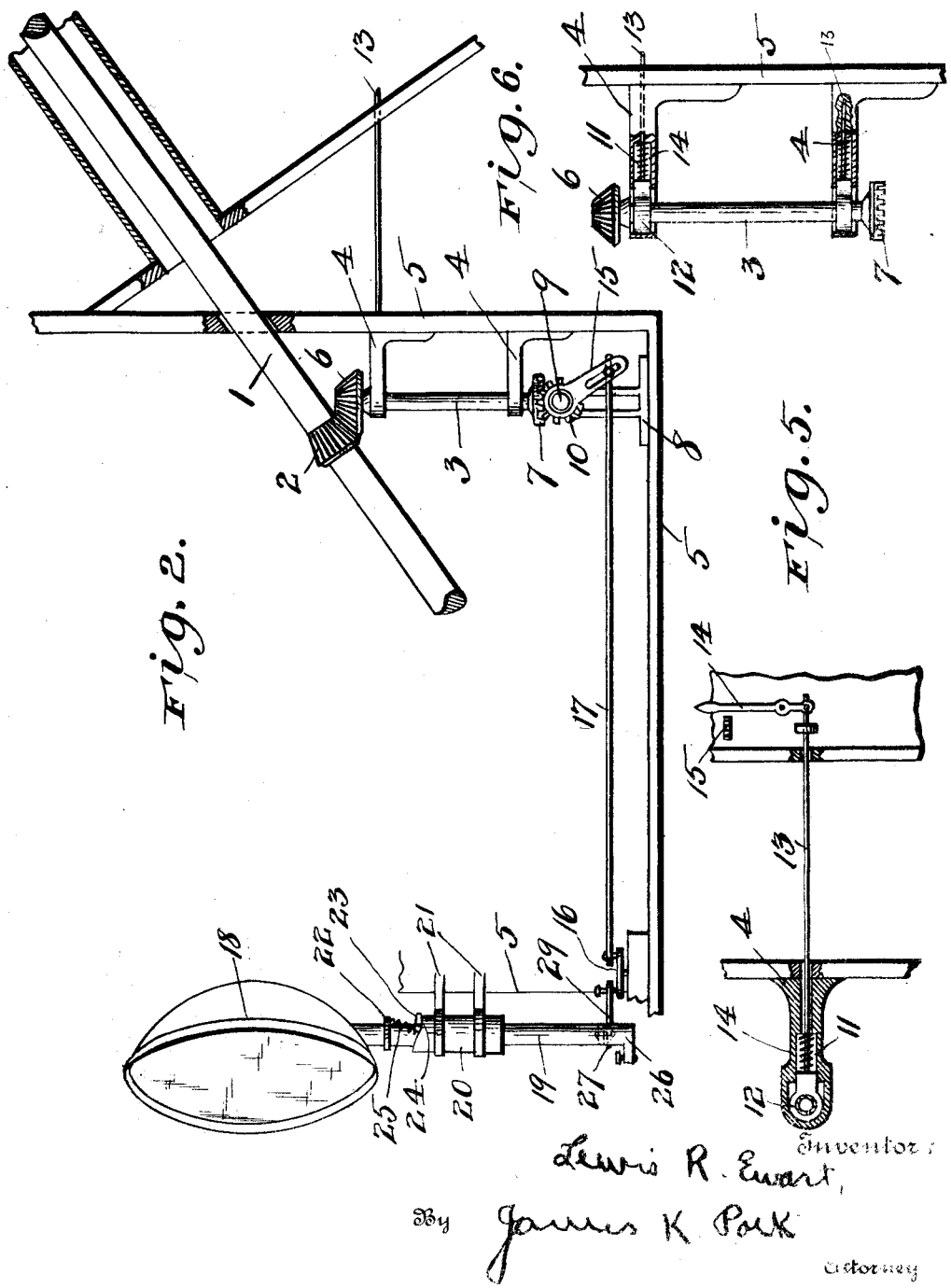

UNITED STATES PATENT OFFICE.

LEWIS R. EWART, OF CODY, WYOMING.

HEADLIGHT-CONTROLLER FOR VEHICLES.

1,198,711.  Specification of Letters Patent.  Patented Sept. 19, 1916.

Application filed March 7, 1916. Serial No. 82,610

*To all whom it may concern:*

Be it known that I, LEWIS R. EWART, a citizen of the United States, residing at Cody, in the county of Park and State of Wyoming, have invented certain new and useful Improvements in Headlight-Controllers for Vehicles, of which the following is a specification.

My invention relates to an improvement in headlight controllers for vehicles, and more particularly to automatic headlight controllers.

The invention consists in the several features and in the construction, combination, and arrangement of the several features as more particularly hereinafter described and claimed.

The object of the invention is to provide an automobile headlight controller by means of which the headlights are automatically turned in accordance with the angle taken by the front steering wheels of the automobile, thereby causing the rays of light radiating from the headlights to be directed in the course being followed by the automobile, in accordance with the position of the steering-wheels, which insures the full illumination of that portion of the roadway which is being approached and which is being traveled over, which is much more satisfactory than the present arrangement, commonly in use, in which the headlights are fixed on the front or chassis of the automobile.

A further object of my invention is to provide a headlight controller which, by directing the rays of light in the direction in which the automobile is proceeding, will prevent accidents, or at least reduce them to a minimum degree.

A further object of my invention is to provide a headlight controller which will be automatically operated by means, or through the medium, of the steering shaft or post.

A still further object is to provide a headlight controller which is simple, inexpensive, and durable in construction, and easy and effective in operation.

Referring to the drawings, Figure 1 is a top plan view, partly broken away; Fig. 2, a side view; Fig. 3, a rear view of one of the headlights; Fig. 4, a side view of one of the headlights; Fig. 5, a plan view, partly in section, of the device for throwing the headlights out of operation with the steering-wheel shaft or post; and Fig. 6, a side view of the device shown in Fig. 5.

In the drawings, in which like reference characters denote like parts throughout the several views, 1 represents the usual type of steering-wheel automobile shaft, provided with a bevel gear 2, and 3 a vertically extending shaft mounted in brackets 4, projecting forwardly from the frame 5 of the automobile, and provided with a bevel gear 6 at its upper end which meshes with the bevel gear 2 of the steering-wheel shaft and a gear 7 at its lower end.

A vertically extending bracket 8 is provided on the frame of the automobile, and a horizontal shaft is mounted therein, having a gear 10, which meshes with the gear 7 of the shaft 3.

Each of the brackets 4 is made hollow, as at 11, and has a slidable journal 12 mounted therein, in which is mounted the shaft 3, and 13 are rods for operating the said journals, and 14 spiral springs which encircle said rods and serve to keep the shaft 3 in its normal position in operative relation with the gear 2 of the steering-shaft.

The rod 13 of the upper bracket 4 extends rearwardly into the automobile and is provided with a lever 14 for operating the same, which when the rod is in its rearward position, gears 2 and 6 being out of gear, is adapted to engage and be held or locked by the rack 15. The rod 13 of the lower bracket is only for the purpose of serving as a guide for the slidable journal and is not intended to be supplied with a lever or other operating means.

An arm 15 is fixed on the end of the short shaft 9 and a link 16 is pivoted horizontally to the frame 6, and 17 is a rod having its opposite ends pivoted to the arm 15 and the link 16.

The headlights 18, preferably two in number, are each mounted on a vertical shaft 19, which in turn is rotatively mounted in a sleeve 20, supported in brackets 21, fixed to the automobile frame.

The upper part of the shaft 19 is provided with an integral ring 22 and just below said ring with a laterally-projecting lug 23.

The upper edge of the sleeve 20 is curved rearwardly and downwardly, as at 24, and the lug 23 engages and bears on said curved edge, and spiral springs 25, connected to the ring 22 and to the sleeve 20, keep the lug 23 in constant engagement with the curved edge of the sleeve, said spiral springs serving to provide or compensate for any vertical movement of the shaft and also to automatically return the headlights to their normal positions facing forward. The lower end of each of the shafts 19 is provided with a lug 26, the shaft at the left hand side of the automobile being provided with a lug 27, and 28 is a laterally-extending rod pivotally connected to said lug 26, a link 29 being provided, one end pivoted to the lug 27 and the other end to the link 16.

The operation of the device is so evident that it is not thought necessary to recite the same.

I do not desire to be understood as limiting myself to the specific details of construction and arrangement as herein described and illustrated as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

Having thus described my invention, what I claim is—

1. In a headlight-controller, vertical shafts having headlights, means for allowing said shafts to move vertically, a steering-shaft, a vertical shaft, slidable spring-controlled journals in which said shaft is mounted, gears operatively connecting said shafts, a gear on the lower end of said vertical shaft, a horizontal shaft having a gear meshing with the gear on the lower end of the vertical shaft and an oscillating arm, means for operatively connecting said oscillating arm with the shafts of the headlights.

2. In a headlight-controller, vertical shafts having headlights, a steering-shaft having a gear, a vertical shaft provided with a gear at its upper end meshing with the gear on the steering-shaft, a gear on its lower end, brackets each provided with a slidable bearing in which the said vertical shaft is mounted, springs for retaining said vertical shaft in its normal position and means for sliding said journals and disconnecting the vertical shaft from the steering-shaft, and means for operatively connecting the vertical shaft with the shafts of the headlight.

3. In a headlight-controller, rotatable headlights, a steering-shaft, brackets having recesses, bearings slidably mounted in said recesses, a vertical shaft operatively connected to the steering-shaft and rotatably mounted in said slidable bearings, springs for retaining said bearings in their normal forward positions, means for sliding said bearings rearwardly and causing the vertical shaft to be disconnected from the steering-shaft and means for operatively connecting the said vertical shaft with the headlights.

In testimony whereof I have signed my name to this specification in the presence of two subscribing witnesses.

LEWIS R. EWART.

Witnesses:
  F. F. McGEE,
  KATHARINE RUSSELL.